United States Patent [19]

Vahabpour

[11] Patent Number: 5,188,019
[45] Date of Patent: Feb. 23, 1993

[54] AUTOMATIC TEA MAKER

[76] Inventor: Abdolvahab K. Vahabpour, 14315 Moorpark St., Apt. 110, Sherman Oaks, Calif. 91423

[21] Appl. No.: 859,972

[22] Filed: Mar. 30, 1992

[51] Int. Cl.⁵ .............................................. A47J 31/00
[52] U.S. Cl. ........................................ 99/285; 99/288; 99/300; 99/316; 137/897; 137/606; 141/104; 222/144.5; 222/145; 251/122
[58] Field of Search .......... 99/285, 279, 288, 293–295, 99/299, 300, 304–306, 316; 137/605, 606, 897, 898; 141/104; 222/144.5, 129, 145; 251/122, 318

[56] References Cited

U.S. PATENT DOCUMENTS

| | | | |
|---|---|---|---|
| 1,512,971 | 10/1924 | Zolleis | 222/144.5 |
| 1,517,744 | 12/1924 | Moneuse | 222/145 |
| 2,173,979 | 9/1939 | Picut | 251/122 |
| 2,869,759 | 1/1959 | Brundage | 222/145 |

FOREIGN PATENT DOCUMENTS

| | | | |
|---|---|---|---|
| 133 | 10/1844 | France | 99/305 |
| 6749 | of 1835 | United Kingdom | 99/288 |
| 4120 | of 1882 | United Kingdom | 99/288 |
| 10701 | of 1887 | United Kingdom | 222/145 |
| 20505 | of 1897 | United Kingdom | 99/288 |
| 576811 | 4/1946 | United Kingdom | 99/285 |

Primary Examiner—Harvey C. Hornsby
Assistant Examiner—Mark Spisich
Attorney, Agent, or Firm—Roger A. Marrs

[57] ABSTRACT

Apparatus is disclosed herein for extracting a flavor from a natural leaf, powder of the like, such as tea leaves into a heated substance as a carrier such as a quantity of water. The apparatus employs a container with a heater for the water which will controllably bring the water to a boil. A tank is submerged in the water and includes a perforated strainer holding a quantity of loose tea leaves for wetting by the surrounding water. A dispensing nozzle is included, having a supply line from the water and a second supply line from the tea leaf tank. A valve arrangement selectively combines the supply lines to produce a desired flavor strength of the dispensed flavored liquid. A manually operable valve selectively intercommunicates the boiled water with the tea leaf tank and controls regulate the heater and temperature.

1 Claim, 2 Drawing Sheets

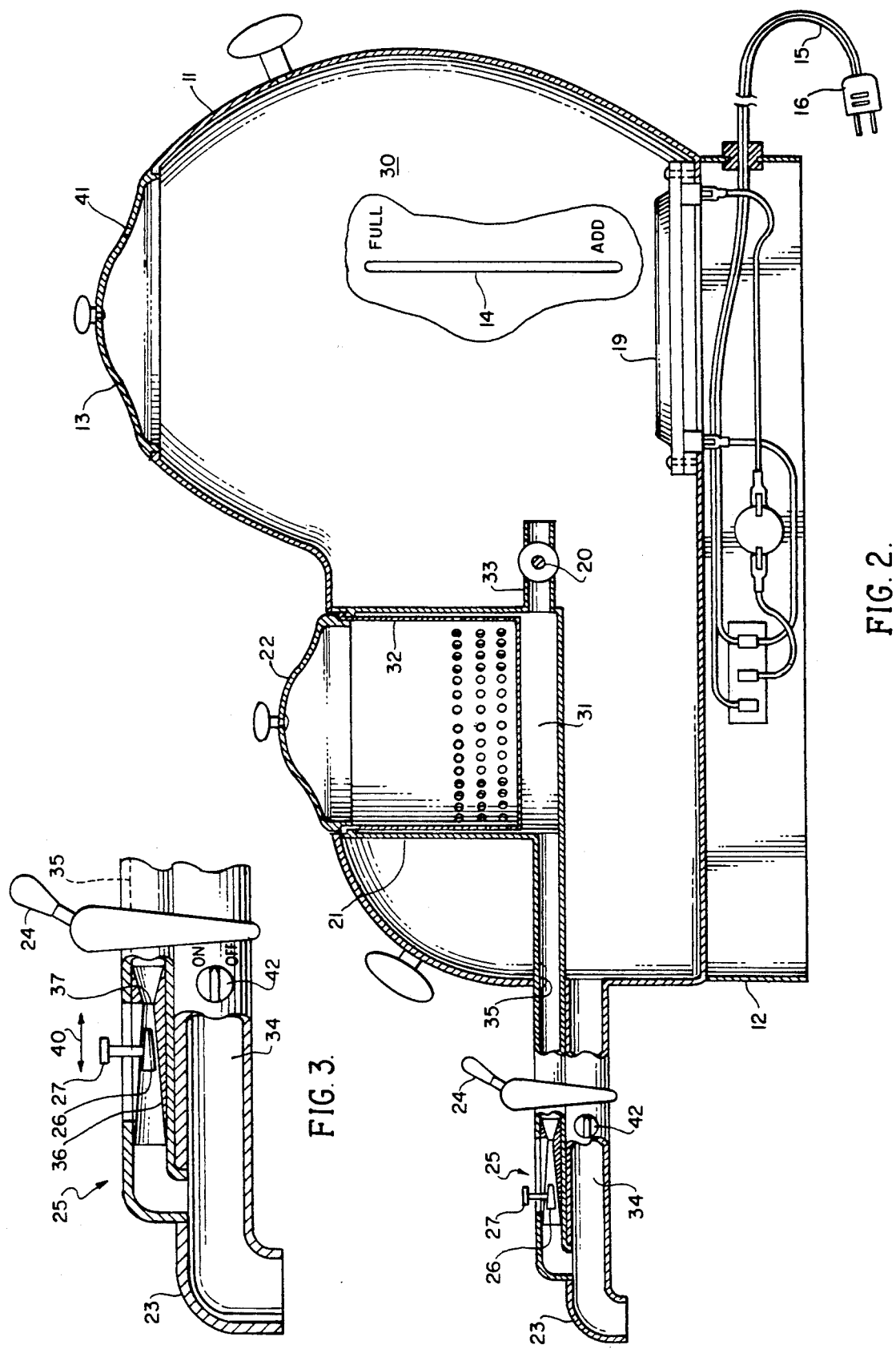

AUTOMATIC TEA MAKER

BACKGROUND OF THE INVENTION

1. Field of the Invention

The present invention relates to the field of beverage makers, and more particularly to a novel apparatus for brewing tea leaves and extracting a flavored liquid which is dispensable in accordance with the taste of the user with respect to flavor strength.

2. Brief Description of the Prior Art

In the past, it has been the conventional practice to introduce tea leaves or the like into a boiling liquid such as water so that the flavor of the leaf is extracted and circulated within the water medium. At the judgment of the user, the strength of the flavor is under the control of the user who selectively removes the tea leaves from the boiling water after a period of steeping. The flavored liquid may now be dispensed by pouring into a cup or other serving device. Some attempts have been made to automate the steeping procedure by including timers, valves and other apparatus for controlling the release of the flavor substance into the surrounding boiling water and dispensing the same.

Difficulties and problems have been encountered with such apparatus which stem largely from the fact that the flavor strength differs from one individual to another and automatic devices do not take such differences into account. Furthermore, conventional automatic beverage machines do not include a means for combining a concentrated flavored liquid with unflavored water so that the user may judge or select a desired flavor strength. Other problems have been encountered with conventional beverage makers which reside in their expense, complexity and cumbersome operation.

Therefore, a long-standing need has existed to provide a novel beverage maker, particularly for the extracting of flavor from tea leaves, which is simple to use, inexpensive to manufacture and which provides a means by which the user may readily select the strength of flavor as the flavored beverage water is being dispensed.

SUMMARY OF THE INVENTION

Accordingly, the above problems and difficulties are obviated by the present invention which provides a novel beverage maker for brewing tea from a quantity of tea leaves, which includes a housing containing a liquid such as water and which incorporates a controlled burner or heater so that the enclosed water may be brought to a boil. The housing further includes a chamber or tank for removably mounting a strainer into which a quantity of tea leaves is placed. Conduit and valve means are carried on the housing between the heated water supply and the tank so that at the selection of the user, heated or boiled water may be introduced into the tank in order to wet and extract flavor from the leaves. A discharge nozzle is provided for dispensing either water from the housing or tea flavored water from the tank via a selector valve which monitors and controls the amount of tea flavored water being mixed with the housing water so that the strength of tea extract can be controlled during the dispensing procedure. In one form, the selector valve takes the form of a slideable member having apertures of different size adapted to align or register with the tea flavored water conduit prior to combining or mixing with the housing water.

Also, an ON/OFF valve is incorporated into the discharge nozzle and heater controls as well as water level indication is provided on the housing. A water level indicator can also be incorporated into the housing so that the user may check on the availability of water in the housing for use in the making of the beverage.

Therefore, it is among the primary objects of the present invention to provide a novel beverage maker for wetting and extracting flavor from tea leaves which includes means for selectively determining the flavor strength of the liquid being dispensed from the beverage making apparatus.

Another object of the present invention is to provide a novel tea making apparatus which is relatively inexpensive to produce and which may be readily used by unskilled persons without the requirement of special skills.

Still a further object of the present invention is to provide a novel tea beverage apparatus which includes a unique valve selector for combining tea flavored water with clear boiling water so that a desired tea strength is dispensed.

Yet another object of the present invention is to provide a novel beverage maker for wetting and steeping tea leaves and which includes a means of dispensing the flavor extracted from the tea leaves into a selected dispensing strength.

Another object of the invention is to provide a novel beverage maker incorporating a pair of water chambers and having separate discharge conduits which are joined together by a selector valve so that the amount of tea flavored water in one container or tank may be combined and mixed with clear water from the other container whereby tea strength is readily controlled by the user.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with accompanying drawings in which:

FIG. 2 is a transverse cross-sectional view of the beverage maker shown in FIG. 1; and FIG. 3 is an enlarged transverse cross-sectional view of the flavor selector valve employed in the beverage maker of FIG. 2 as taken in the direction of arrows 3—3 thereof.

DESCRIPTION OF THE PREFERRED EMBODIMENT

Figure 1:
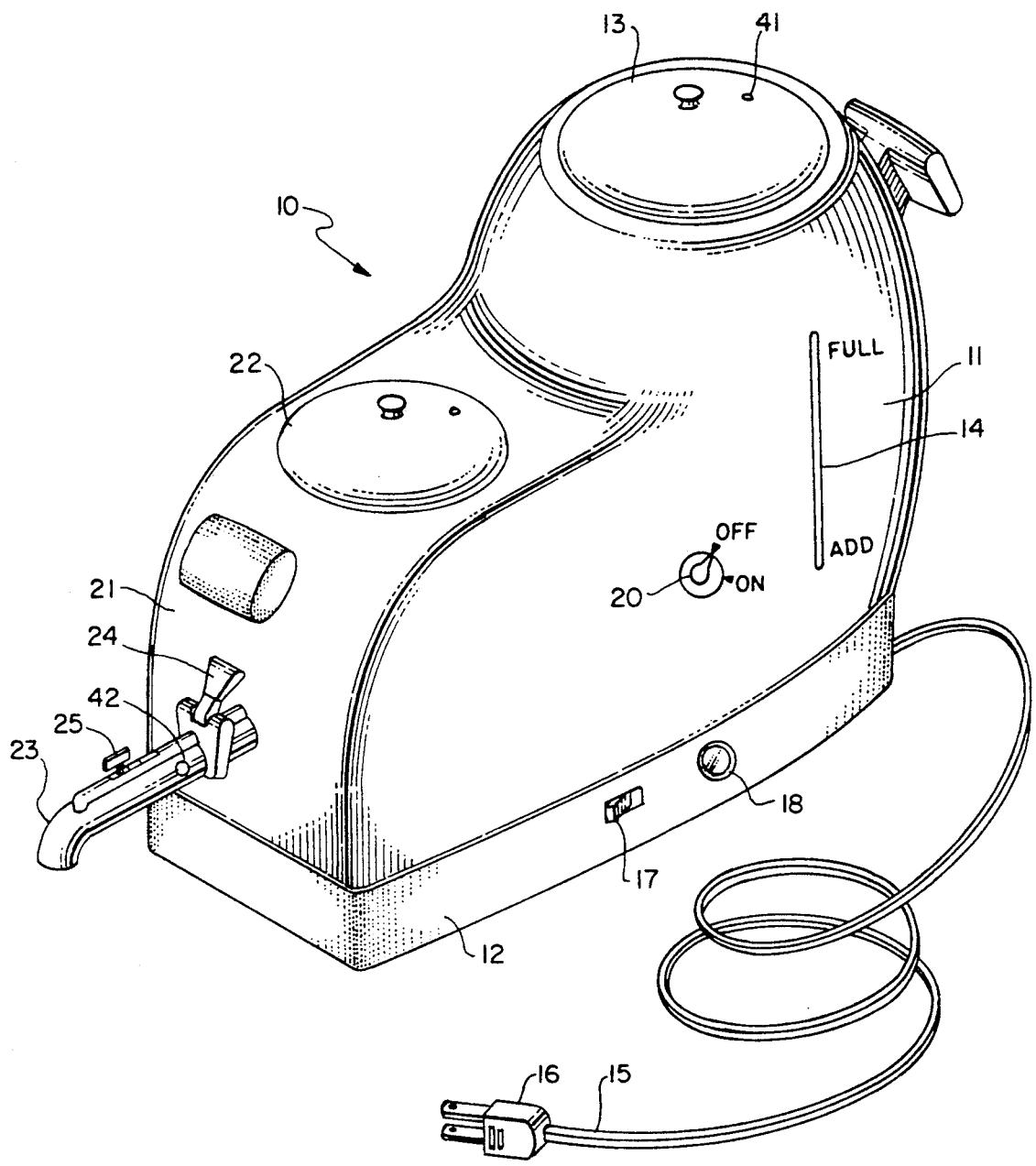
FIG. 1 is a front perspective view showing one embodiment of the beverage maker incorporating the present invention.

Referring to FIG. 1, the novel beverage maker of the present invention is indicated in the general direction of arrow 10 which includes a housing 11 having a base 12 which incorporates components for controls and switches as well as electrical cords and connections in accordance with approved electrical parameters. The container 11 is hollow and includes a top opening covered by a lid 13 which, when removed, permits liquid such as water to be introduced into the interior of the container 11. A visual indicator is represented by numeral 14 so that the user may observe whether the liquid in the container is full or whether liquid needs to be added. The electrical network included in the base 12 terminates in a power supply cord 15 that may be readily connected to a power line via conventional plug 16. The electrical circuit may include an ON/OFF switch 17 as well as an electrical resistance control 18 so that the user may set the heater to boil or warm condition. A toggle switch 17 is employed as an ON/OFF switch. The heater connected to the electrical circuit or network is within the housing 11 and will be described later.

The housing 11 further includes a flavor extracting compartment broadly indicated by numeral 21 (which will be described later) and which is closed by means of a second lid or cover 22. Both the main compartment in housing 11 and the steeping compartment 21 are connected in common to a dispensing nozzle 23 so that the contents of both compartments within the housing can be joined together under the control of a conventional ON/OFF valve 24 and an extract or flavor control selector valve 25. The selector valve 25 includes a slider member 26 which includes a projection 27 that may be grasped by the fingers of the user and moved with respect to the main body of the valve 25. The selector member 26 is employed for controlling the volume of flavored water dispensed from the steeping tank 21 prior to mixing or combining with clear water from the main housing tank prior to dispensing via the nozzle 23.

Referring now in detail to FIG. 2, it can be seen that the housing 11 includes a main chamber or compartment, identified by numeral 30, into which a quantity of liquid such as water is stored preparatory for heating. The lid 13 is removable so that the water may be easily introduced into the chamber 30 and the water will come into contact with a resistance heater 19 operably connected to the electrical circuit within the base 12. A second chamber or compartment is broadly identified by numeral 31 and is within the housing compartment 21 having cover 22 enclosing an opening into the compartment 31. A strainer is indicated by numeral 32 which includes a perforated sidewall so that liquid will pass from the compartment 31 into the interior of the strainer and back out again. A quantity of tea leaves may be placed into the strainer 32 when the lid 22 is removed. The quantity of tea leaves is loose and the chamber 31 may be represented as a steeping or brewing chamber into which flavor is extracted from the tea leaves when hot or boiled water is introduced into the chamber 31. It can be seen that a pipe or conduit 33 interconnects the main housing chamber 30 with the brewing chamber 31 and that a manually operated one-way valve 20 serves as an ON/OFF valve for permitting the boiled or hot water in chamber 30 to pass into the brewing chamber 31.

It can also be seen in FIG. 2 that a first conduit 34 communicates the housing chamber 30 with the nozzle 23 and that a second conduit 35 communicates the brewing chamber 31 with the nozzle 23 via the first conduit 34. Therefore, the concentrated tea water in the brewing chamber 31 may be introduced and mixed with the clear water in chamber 30 as the combined water is being dispensed from the nozzle 23 under control of the valve 24.

Referring now to FIGS. 2 and 3, the selector valve 25 including the slider member 26 controls the amount of brewed tea water supplied from brewing chamber 31 to the dispensing nozzle 23. The slide member 26 moves along a tapered ramp 36 and is selectively placed in registry and alignment with a reduced orifice 37. When member 26 is close to the orifice 37, a light flavored or light strength tea water is permitted to pass through the second conduit and to be mixed with clear water from chamber 30 in the first conduit 34. When the slider member 26 is moved so as to be in the middle of ramp 36, a medium strength fluid is introduced for mixing with the clear water and, as illustrated in FIG. 3, when the member 36 is in registry with the enlarged orifice 38, a heavy or strong flavored fluid is permitted to pass for mixing with the clear water. The slider member rides within the interior of the conduit 35 in a rectilinear manner, as indicated by the double arrow 40. A conventional shut-off valve is indicated by numeral 42 for closing conduit 34 when tank 31 is cleaned.

In view of the foregoing, it can be seen that the tea maker of the present invention permits the brewed tea in chamber 31 to be mixed with the clear and hot water in the chamber 30 via the first and second conduits so that the fluids are mixed and dispensed in common through the nozzle 23. If desired, the selector member 26 may be slid to a position to close orifice 37 so that only clear water is permitted to be discharged from dispensing nozzle 23 via conduit 34. This may be practiced for cleaning purposes. The strainer 32 may be readily removed from the brewing chamber or tank 31 and old leaves may be disposed in accordance with conventional practice. New leaves may then be introduced into the strainer and replaced into the chamber 31 for another brewing operation. Water may be added to the main housing chamber 30 by removing the lid 13. The heater 19 is employed for warming or boiling the water and a vent 41 may be employed for the release of steam which may whistle in order to alert the user that boiling is achieved.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A beverage making apparatus comprising:
   a container for holding a quantity of water;
   means carried on said container for heating said quantity of water;
   a tank within said container for holding a quantity of tea leaves;
   piping operably interconnecting said tank and said container;
   valve means selectively connecting said quantity of water with said tank via said piping to soak and steep said tea leaves to extract flavor ingredient from said tea leaves into surrounding water;
   a dispensing nozzle connected with said container and said tank whereby water from said container and tea from said tank combine for common discharge via said nozzle;
   selector valve means operably disposed on said dispensing nozzle for selectively discharging tea from said tank and water from said container;
   said valve means is a flip type ON/OFF manually operated valve;
   said selector valve means comprises a movable member disposed through a first conduit between said tank and said nozzle for controlling passage of tea from said tank to said nozzle;

a second conduit connecting said container to said nozzle for conducting water from said container to said nozzle;

a strainer removably mounted in said tank for holding said tea leaves;

said container includes an opening closed by a removable lid;

said lid having a vent means capable of whistling when said container water has reached boiling;

control means coupled to said heating means for determining ON/OFF and temperature selection;

indicator means disposed on said container for visually indicating water level in said container; and said selector valve means includes a ramp means within said first conduit having an open-ended tapered passageway movably mounting said movable member.

* * * * *